United States Patent [19]

Fraden

[11] Patent Number: 4,854,730

[45] Date of Patent: Aug. 8, 1989

[54] RADIATION THERMOMETER AND METHOD FOR MEASURING TEMPERATURE

[76] Inventor: Jacob Fraden, 72 Hampton Rd., Hamden, Conn. 06518

[21] Appl. No.: 84,818

[22] Filed: Aug. 13, 1987

[51] Int. Cl.$^4$ ............................................. G01K 7/00
[52] U.S. Cl. ..................................... 374/164; 128/736
[58] Field of Search ................. 374/164, 158; 128/736, 128/664

[56] References Cited

U.S. PATENT DOCUMENTS

| | | | |
|---|---|---|---|
| 3,581,570 | 6/1971 | Wortz | 128/736 |
| 3,832,902 | 9/1974 | Usami et al. | 374/158 |
| 3,915,003 | 10/1975 | Adams | 374/164 |

*Primary Examiner*—Roy N. Envall, Jr.

[57] ABSTRACT

An electronic radiation thermometer utilizing temperature sensitive resistor (thermistor) as a radiometer sensor. The sensor is heated to higher than target temperature, its resistance is maintained constant during measurement by a control circuit. Electric power required to balance radiation heat losses is proportional to net flux, which, in turn, depends on temperature of a target. That power value is processed by an electronic circuit to calculate target temperature. The thermometer probe does not absorb infrared radiation but emits it toward the target. The thermometer comprises reflective cavity with thermistor placed in a focal point, self-balancing resistive bridge with control amplifier and an electronic processing circuit. For the medical application, the thermometer is built in an elongated form and uses a disposable speculum, which is placed over the reflective cavity. Medical thermometer can take either core temperature from ear canal or mouth, or surface skin temperature.

17 Claims, 4 Drawing Sheets

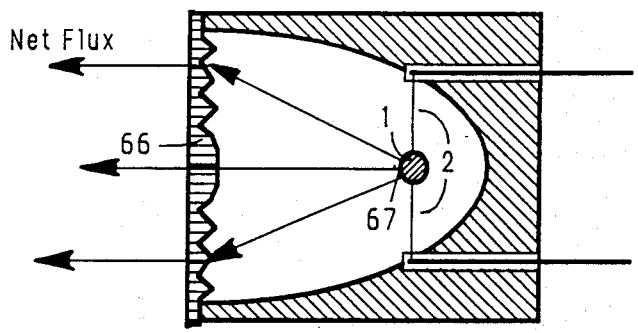
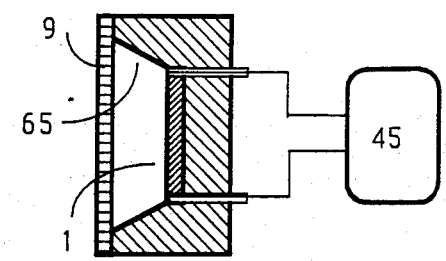
Fig. 9          Fig. 10
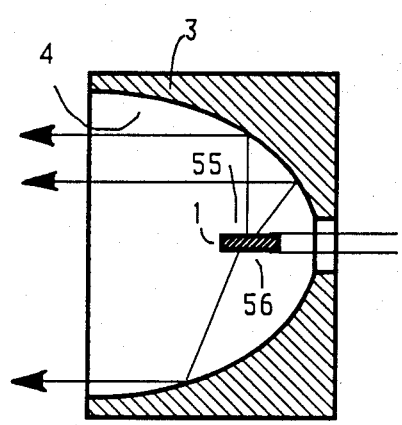
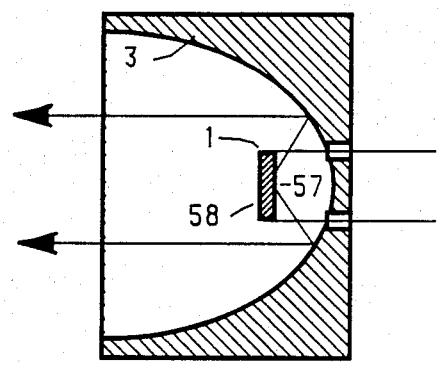
Fig. 11          Fig. 12
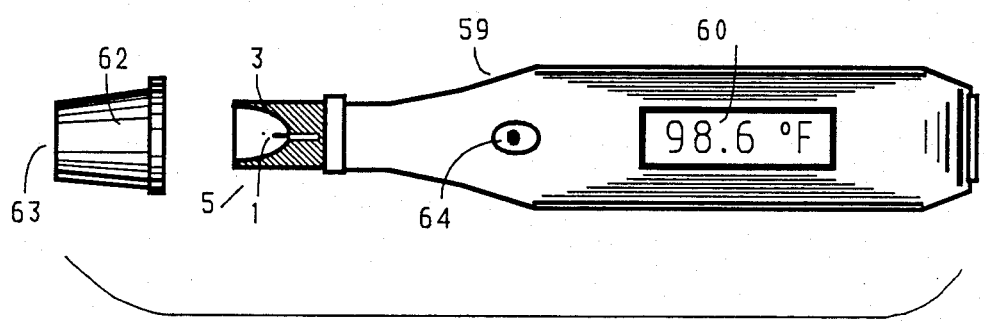
Fig. 13

RADIATION THERMOMETER AND METHOD FOR MEASURING TEMPERATURE

BACKGROUND OF THE INVENTION

This invention relates to an electronic thermometer and more particularly to a noncontacting infrared electronic thermometer and method for measuring temperature of an object without contact with it.

The temperature of an object, such as the human body, can be determined by using a contact thermometer or by measuring the natural thermal radiation from it surface in infrared and far infrared spectral ranges. The radiation is related to temperature of the object and can be utilized to determine the temperature of the body.

Numerous devices have been proposed for making noncontact temperature determination. Among them the U.S. patents issued to Wormser U.S. Pat. No. 2,798,962, Derganc U.S. Pat. No. 2,920,485, Siegert et al U.S. Pat. No. 3,023,398, Barnes U.S. Pat. No. 3,282,106, Hewett et al U.S. Pat. No. 3,303,430, Treharne U.S. Pat. No. 3,344,739, Paddock U.S. Pat. No. 3,463,006, Wortz U.S. Pat. No. 3,581,570, Risgin et al. U.S. Pat. No. 3,777,568, Michael U.S. Pat. No. 4,005,605, Berman et al. U.S. Pat. No. 4,372,690, Crane et al. U.S. Pat. No. 4,470,710, Irani U.S. Pat. No. 4,525,896, O'Hara et al. U.S. Pat. No. 4,602,642.

The prior art infrared thermometers use a well known concept, as exemplified by the teachings of the above mentioned U.S. Pat. Nos. 2,798,962; 2,927,464; 3,920,485 and 4,470,710. The instruments include one or more "reference" radiation sources of constant and known temperature, a detector which is capable of measuring radiation from both target and "reference" sources and a "chopper" to alternate radiation sources. A different solution is the use of a moving reflector (U.S. Pat. No. 4,005,605). Another principle, which was used to produce the infrared thermometers, is based on monitoring of ambient temperature to compensate for changes in detected radiation flux (U.S. Pat. No. 4,527,896). U.S. Pat. No. 3,581,570 issued to Wortz describes a radiation thermometer where a thermistor or other thermal sensor is placed into the focal point of a parabolic mirror in order to collect radiation flux from an ear canal. Barnes (U.S. Pat. No. 3,282,106) claimed germanium or silicon lenses to focus infrared radiation on the radiometer, U.S. Pat. No. 4,602,642 issued to O'Hara et al. teaches warming up of the thermopile sensor by an external heating source to the precise temperature of an object and by using an additional thermistor to regulate heating of thermopile. Another patent of O'Hara et al. U.S. Pat. No. 4,662,360 discloses a disposable speculum which can be placed over the thermometer probe to use it as a sanitary barier in medical applications.

A number of the prior art disclosures (for instance, U.S. Pat. No. 3,581,570) cited above mention thermistors as means to detect infrared radiation. None of them succeeded to overcome a major problem of that sensor, which is slow speed response and, to the applicant's knowledge, none of the thermistor based infrared thermometers have been successfully reduced to practice. All infrared thermometers known in the prior art have the following limitations: dependence on the linearity of the radiation sensor, strong sensitivity to ambient temperature which required use of multiple sensors and moving parts or necessity of an additional temperature sensing means and/or heating elements and thermostats. Most of the radiation thermometers, which were reduced to practice, are large and cumbersome instruments.

It is an object of the present invention to provide a new and improved noncontacting electronic thermometer which is accurate, reliable, small in size, has no moving parts and economical to manufacture.

Another object of the invention is to provide a noncontacting electronic thermometer for medical use which is compact, fast, inexpensive and convenient to use.

A further object of the invention is to provide a method for measuring temperature of an object by utilizing a self-heating temperature sensitive resistor with electronically controlled resistance.

SUMMARY OF THE INVENTION

Contrasted with the devices of the prior art, the present invention provides the means and method of measuring temperature of an object using natural infrared radiation, without the need of placing sensor into a thermostat or using reference heat sources or employing moving parts. This is achieved by using a self-heating sensor and an electronic control circuit for keeping its temperature constant, and measuring power required for this. The power, which is used to compensate for thermal radiation losses of the sensor, is directly proportional to net thermal flux exchange between the object and the sensor. As a result, knowing that power, the object's temperature can be calculated with high degree of accuracy. Furthermore, since temperature of the sensor is maintained constant and higher than that of environment, its response to flux change is much faster then in conventional thermistor based radiation thermometers having sensors whose surface temperature is flux dependent. Contrary to the prior art, the proposed thermometer is not a passive device which detects natural radiation, but rather it actively radiates thermal energy toward the object.

BRIEF DESCRIPTION OF THE DRAWINGS

FIG. 9 is a schematic cross section view of a Fresnel lens focusing arrangement FIG. 10 is a schematic cross section view of a film sensor in the probe FIG. 11 is a schematic cross section view of a parabolic reflector with radial lead thermistor FIG. 12 is a schematic cross section of a film thermistor mounted in a parabolic reflector FIG. 13 is an overall view of medical thermometer with disposable speculum

DESCRIPTION OF THE PREFERRED EMBODIMENT

Any infrared thermometer relies on the Stefan-Boltzmann formula for radiated flux, F:

$$F = \sigma A \epsilon_s \epsilon_b (T_s^4 - T_b^4) \quad 1$$

where $\sigma$ is Boltzmann constant, A effective sensor area, Ts—sensor temperature, Tb—target temperature, $\epsilon_s$ and $\epsilon_b$ emissivities of sensor and target (object) respectively. It follows from Formula 1 that, along with flux, F, either reference temperature or temperature of the sensor (Ts) must be known to calculate target temperature, Tb. The above analysis of the prior art shows that this is the basis for the all prior art inventions.

The proposed invention is also based on Formula 1, but instead of providing a reference radiation source of known temperature, or monitoring temperature of the sensor, a self-heating radiation sensor is used. Many temperature sensors, such as thermistors and RTD, are temperature sensitive resistors. Passing electrical current through such sensor results in heating effect, changing its temperature to higher than that of environment level. In the present invention, a radiation temperature sensor (thermistor) is supplied with a control circuit which regulates electric power (voltage and current) through the sensor in such way as to keep its resistance (and, subsequently, temperature Ts) constant. If temperature, Ts, of the sensor is maintained constant and higher than that of a target, there is no need to monitor ambient temperature or provide a reference heat source. As a result, flux radiated by the sensor is higher than that radiated by the target. Hence, contrary to the prior art thermometers, net thermal flux is going out of the probe, rather than into it, which makes temperature measurement an active process. Measuring emanated by the thermometer power provides information about target temperature.

Electric power, required to control the sensor temperature, can be represented by the following formula:

$$P = V^2/R_s \quad 2$$

where V is voltage across the sensor and Rs is the resistance of the sensor at constant temperature $T_s$. If the sensor is brought in the vicinity of a target having different temperature, $T_b$, and temperature of the sensor is maintained constant at level $T_s$, and if conduction and convection heat loss are very small, the steady state condition requires that Formula 1 is equal to Formula 2. Therefore, voltage across the thermistor, V, will unambiguously represent temperature of the target:

$$T_b = (T_s - V^2/\sigma A \epsilon_s \epsilon_b) - 4 \quad 3$$

Figure 5:
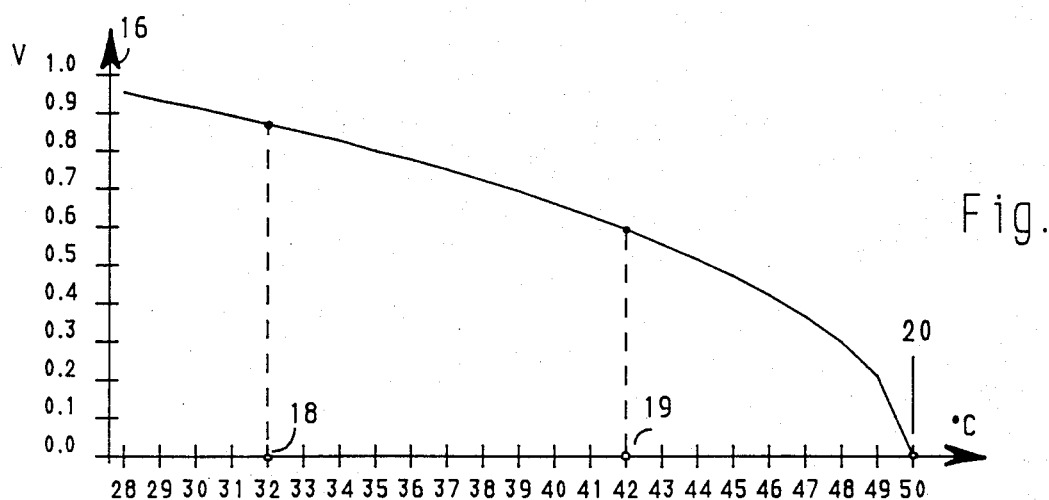
FIG. 5 is a voltage-vs-target temperature chart representing output signal from the circuits shown in FIGS. 3 and 4.

The control circuit will automatically balance out any changes in radiation heat exchange between the sensor and the target, keeping $T_s$ and $R_s$ constant. The control voltage, V (16), is shown in FIG. 5. Point 20 on the temperature axis indicates constant surface temperature, $T_s$, of the thermistor. In the example, the thermistor, 1, is heated to $T_s = 50°$ C. That temperature is convenient to use in the medical applications because it is higher than any possible body temperature. Points 18 and 19 define boundaries of the target temperature range. Voltage, 16, can be used as an output signal for further processing and display. Such processing shall include solution of Formula 3, and can be performed by an appropriate analog or digital circuit which is of conventional design and is not described here.

Figure 1:
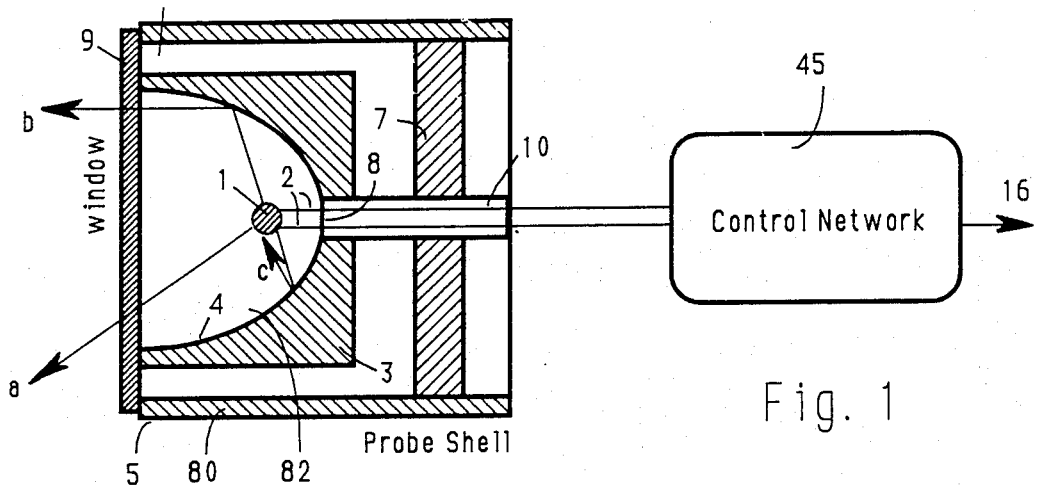
FIG. 1 is a diagrammatical broken away view of the thermal radiation sensor

A preferred arrangement of the sensor is shown in FIG. 1. It includes the probe body, 5, temperature sensitive resistor, 1, such as a thermistor, RTD or like, cavity 82 with reflector 3, hollow central support 10, spacer 7, window, 9, and an electronic control circuit, 45. Output of circuit, 45, is voltage, 16, which represents temperature of an object.

The sensor, 1, must have small thermal mass with possibly larger surface area, A (to maximize output voltage, as it follows from Formula 3). Generally, its emissivity $\epsilon_s$ must be high (close to unity). The sensor, 1, does not touch the reflector, 3, and is supported by two very tiny wires, 2, which, in turn, are connected to the isolating support, 10. The supporting and connecting wires, 2, must be very thin and opening, 8, where wires, 2, enter the support, 10, must be small to minimize heat loss. Reflector, 3, and outer shell 80 of probe body, 5, shall have minimal physical contact with each other to reduce heat conduction. Preferably, there is an air gap, 6, between them. Reflector, 3, shall be made of a material having very low thermal conductivity (PVC plastic or like) and its inner surface, 4, is metallized, preferably with gold, for the highest possible reflectivity. The reflector may be of parabolic, conical, hemispherical, cylindrical or other shapes, depending on the application and sensor form. The front end of the probe is covered with thin window, 9, which can be made of such materials as germanium, polyethylene, KBr or others having a high degree of transmittance in the far infrared spectral range. The design a should assure that heat is exchanged between the temperature sensitive resistor and its surroundings principally through radiation, rather not through conduction or air convection. In some applications, the sensor can be hermetically sealed or filled with low thermal conductivity gas. In addition, radiation exchange must occur principally with the target rather than with with other components of the probe structure, such as connecting wires, window or reflector.

Thanks to the reflector, radiation from the sensor will be going out of the probe aperture through window, 9, and only negligible amount of flux will be absorbed by the cavity walls, 82. For instance, beam, a, will be directly coupled to the outside target (object), while beam, b, will bounce from the mirror wall before it reaches the target. Beam, c, is radiated by the sensor, 1, and returns to it. If reflectivity of inner surface 4 of reflector 3 is high, the net thermal flux of beam, c, is close to zero. Note directions of the arrows in FIG. 1. They indicate that net thermal flux is going out of the probe to the outside environment and target.

Figure 2:
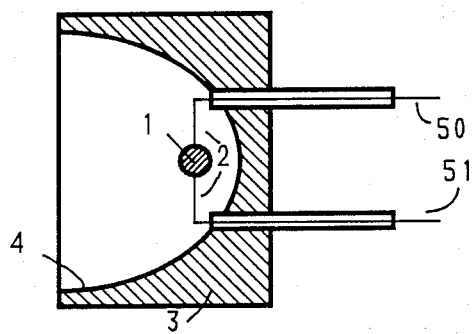
FIG. 2 is a schematic view of a method of mounting a thermistor with axial leads

In the preferred arrangement, sensor, 1, is small and is supported in the focal point of a parabolic reflector by two radial wires. The thermistor sensor, 1, also can be supported by axial wires, 2, as it is shown in FIG. 2. Each wire is attached to the contacts, 51 and 50, supported by the reflector housing, 3.

Figure 8:
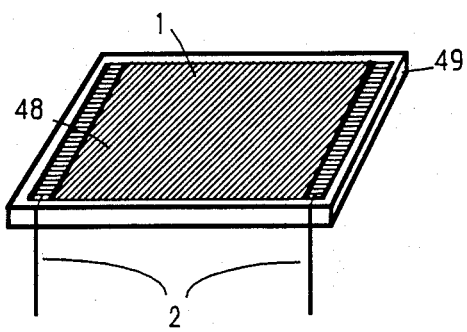
FIG. 8 is a perspective view of a film thermistor temperature sensor

Since the sensor area should be maximized, with the area of reflector surface area, 4, minimized, the sensor can be made in a form of a flat film and positioned close to the window, 9. FIG. 8 shows thermo-resistive material, 48, deposited on the surface of the substrate, 49. Thickness of the resistive layer, 48, preferably should be in the range of 100–500 Å. Thermal capacity and thermal conductivity of the substrate should be small. This will result in better speed response. Rear surface of the substrate, 49, should be reflective for lower emissivity. It preferably shall be coated with gold. FIG. 10 represents how film sensor, 1, can be positioned in the conical reflective cavity, 65, close to the window 9. FIG. 12 shows how film sensor, 1, can be positioned in the focal point of the parabolic reflector, 3. The sensor's reflective surface, 58, is directed toward the opening of the probe, while emissive surface, 57, faces the inner portion of the reflector. This arrangement assures near parallel thermal beam out of the probe. Another version of the thin sensor may have thermoresistive material deposited on both surfaces of the film substrate, as it is shown in FIG. 11. Both emissive surfaces, 55 and 56, are sources of thermal radiation which is directed out of the probe by reflector, 3.

Since temperature of the sensor is essentially maintained constant, the proposed instrument operates much faster than any conventional thermistor based infrared thermometer. The reason for that is in the fact, that there is no need to move sensor's thermal mass from one energy level to another, which is the usual cause for the long thermal time constants and slow speed response to the thermistor based thermometers known in the prior art. In the proposed invention, the speed response primarily depends on the radiation coupling between the sensor and the target, and on minimizing of other than radiation heat losses.

Figure 3:
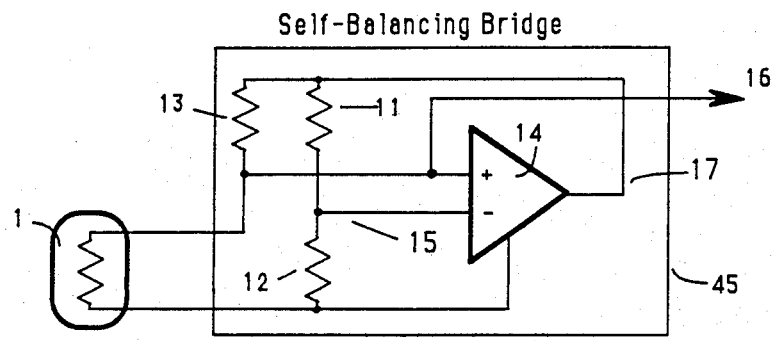
FIG. 3 is an electrical circuit diagram of a self-balancing bridge

In order to measure temperature, thermistor sensor, 1, is connected into an electronic control circuit to maintain its resistance and temperature constant. FIG. 3 shows an electronic control circuit, 45, including a self-balancing bridge with an operational amplifier, 14. Ratio of the resistors 11 and 12 determines a set point at input, 15, while output voltage, 17, from the operational amplifier, 14, determines power supplied to the resistive bridge. After power up, value of the thermistor sensor, 1, changes in a such way, as to maintain voltage, 16 equal to that of input 15. Since ratio of resistors 11 and 12 is temperature independent, resistor, 1, value is also maintained constant, as long as operational amplifier operates in the linear mode. Any variations in heat exchange between thermistor, 1, and surroundings will result in rebalancing of the bridge.

Figure 4:
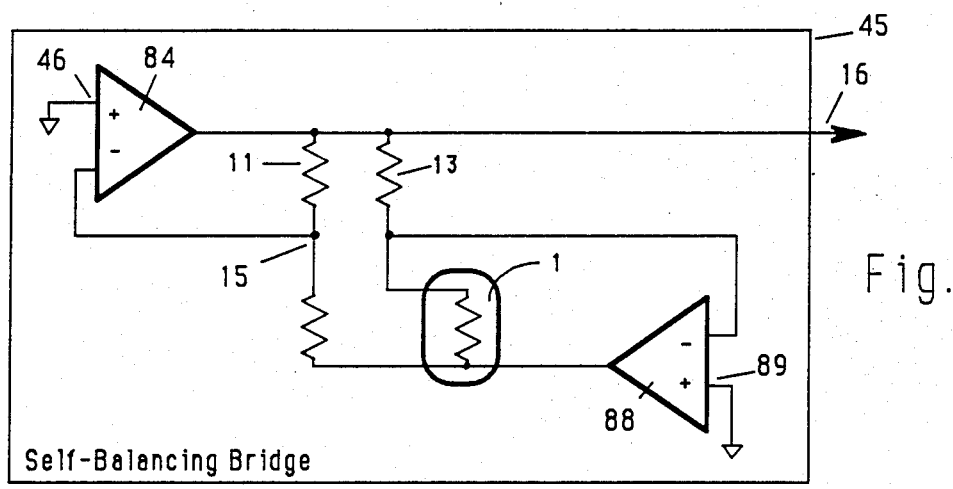
FIG. 4 is an electrical circuit diagram of a self-balancing bridge with two amplifiers

Another version of the self-balancing bridge is shown in FIG. 4, where two operational amplifiers, 84 and 88, are used to keep the bridge in the balanced state. Positive inputs, 46 and 89, of the corresponding amplifiers are grounded or connected to other convenient reference voltage source. This circuit has better noise characteristics than shown in FIG. 3.

Figure 6:
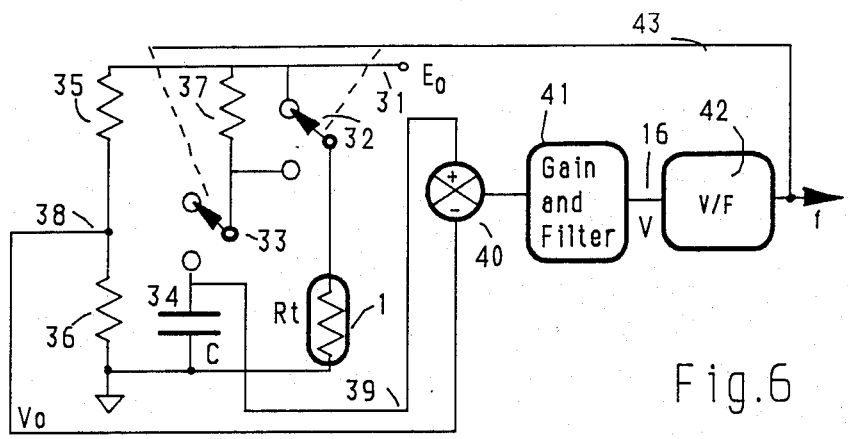
FIG. 6 is an electrical circuit diagram of an electronic control circuit with a voltage-to-frequency convertor

And, another way to maintain resistance of sensor, 1, constant is shown in FIG. 6 where temperature sensitive resistor, 1, is multiplexed between power supply, Eo, connected to wire, 31, and resistive bridge, comprising resistors 35, 36 and 37. The multiplexer consists of two electrically controlled switches, 32 and 33. In the switch position, shown in FIG. 6, the power supply is connected to the sensor, 1, causing a self-heating effect. When both switches go to the opposite position, resistor, 1, becomes part of the bridge, whose output voltages, 38 and 39 are fed into the subtracting circuit, 40. The multiplexing frequency depends on heat losses and for practical reasons should be selected to be in the range of several thousand cycles per second. Capacitor, 34, provides track-and-hold action at the circuit, 40, input. Circuit, 41, provides gain and filtering and feeds voltage, V (16), to the voltage-to-frequency convertor, 42. Its output, 43, pulses control switches 32 and 33 to maintain resistive bridge in balance. Output frequency, f, is a function of radiation flux in the same manner as output voltages in the circuits shown in FIGS. 3 and 4. That frequency can be utilized by the microprocessor (not shown) to calculate temperature of an object.

Figure 7:
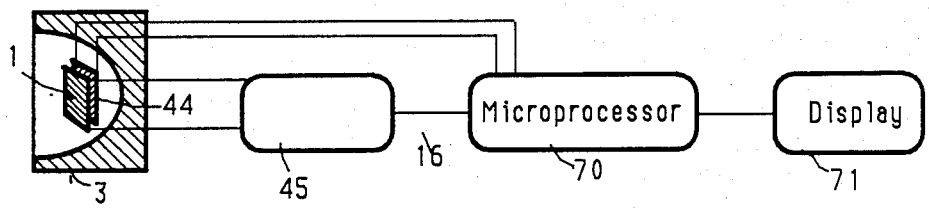
FIG. 7 is a diagrammatic view of a thermometer with ambient temperature correction

For the higher precision measurements it may be desired to compensate for minute heat losses in the probe due to conduction and convection. According to Fourier law, these losses are proportional to temperature difference between the sensor and probe housing. To compensate for that error, an additional thermal sensor, 44, (FIG. 7) is provided. It monitors temperature of the reflector 3 and provides correcting signal to the microprocessor, 70, which, in turn, controls display 71. Temperature sensitive resistor, 1 and electronic control circuit, 45, with self-balancing bridge are similar to those shown in FIGS. 3, 4 and 6.

FIG. 9 shows another way to direct thermal radiation from the sensor, 1. A thin Fresnel lens, 66, is positioned in the front opening of the probe, replacing the window, 9. Sensor, 1, is located in the focal point, 67, of the lens, 66. The lens can be made of such infrared transparent materials as Germanium, Silicon, Polyethylene and others.

The thermometer operates as follows. After power up, the control circuit, 45, (see FIG. 1) elevates temperature of the sensor, 1, to a constant level, 20 (See FIG. 5). That level preferably shall be higher than maximum temperature of a target, which is in the range between temperatures 18 and 19. Thermal flux bounced by the reflector, 3, is directed toward the object. This results in changing voltage, 16, which is the output signal of the control circuit. Signal processing of voltage 16 includes filtering, linearizing, calculating, display and other conventional operations which are not described here in details. Temperature measurements from surfaces having different emissivities, $\epsilon b$, require appropriate corrections during signal processing. To calculate temperatures with possibly smaller errors, such emissivities must be known before measurements are made.

FIG. 13 shows an implimentation of the preferred embodiment in a form of a hand held medical thermometer 59 which inside its case among other components contains microprocessor, display driver and power supply. The probe forms front end of the housing and is represented by a diagrammatical broken away section. The thermometer has an elongated shape with display, 60, and starting switch, 64, positioned on the thermometer body. A reusable or disposable speculum, 62, may be placed, before each measurement, over the probe which contains temperature sensitive resistor 1 in reflector 3 of probe body 5. The speculum is of a generally tubular shape having forward and rearward ends and at the forward end it is covered by a protective thin membrane, 63. The membrane acts as a sanitary barrier between surface of a patient body and the probe. The membrane, 63, should be made of material having small absorption in the infrared range between 4 and 20 $\mu m$. Polyethylene, polypropylene or other suitable plastic sheet can be used. For the measurements, this thermometer can be placed in such patient cavities as the mouth, auditory canal, under the armpit, etc. It also can be used to determine skin surface temperature. The built-in microprocessor, on command from the starting switch, 64, can determine either maximum or varying temperature from a target.

What I claim is:

1. An electronic infrared radiation thermometer for determining temperature of an object, said thermometer comprising:

a body including an opening adapted for radiating infrared energy toward an object;

a self-heating, temperature sensitive resistor;

means for supporting said resistor in said opening for said radiating of said infrared energy, and means for thermally insulating said resistor from said body; an electronic control circuit, connected to said resistor for maintaining temperature and resistance of said resistor constant by adjusting electrical power through the resistor, and for providing a signal that is representative of said adjusted power;

computational means, connected to said electronic control circuit for receiving said signal for calculating the temperature of said object by using said signal.

2. An electronic thermometer as described in claim 1, further comprising:

said opening comprising the shape of a paraboloid of revolution for said radiation of said infrared energy toward the object.

3. An electronic thermometer as described in claim 1, further comprising:

said opening comprising a conical shape for said radiating of said infrared energy toward the object.

4. An electronic thermometer as described in claim 1, further comprising:

said opening including a surface coated with a metallic layer for reflection of infrared radiation.

5. An electronic thermometer as described in claim 1, further comprising:

said temperature sensitive resistor being a thermistor having a high degree of surface emissivity.

6. An electronic thermometer as described in claim 1, further comprising:

said electronic control circuit containing a reference resistor for comparison with said temperature sensitive resistor for said adjusting of the electrical power.

7. An electronic thermometer as described in claim 1, further comprising:

said electronic control circuit containing a self-balancing resistive bridge network for said adjusting of said power.

8. An electronic thermometer as described in claim 1, further comprising:

a thermal sensor, joined with said body for providing a signal for determining conductive and convective thermal heat loss from said temperature sensitive resistor.

9. An electronic thermometer as described in claim 1, further comprising:

a window, positioned across said opening for receiving said infrared radiation between said temperature sensitive resistor and said object, and means for attaching said window to said body.

10. An electronic thermometer as described in claim 9, further comprising:

said window having a high degree of transparency in the infrared range.

11. An electronic thermometer as described in claim 1, further comprising:

said temperature sensitive resistor being a thin resistive layer deposited on a first side of a substrate, said substrate hàving a first side and a second side.

12. An electronic thermometer as described in claim 11, further comprising:

said second side of said substrate being coated with a material having low thermal emissivity.

13. An apparatus for measuring the temperature of an object, said apparatus comprising:

a body having an opening adapted for emitting infrared radiation toward said object;

a sensor comprising temperature sensitive resistive means, positioned inside said opening, and means for attaching said sensor to the housing;

an electronic control circuit connected to said sensor for maintaining said sensor at a constant resistance, and for providing a first signal representative of electrical changes in said circuit which maintain said sensor at the constant resistance;

computational means for calculating the temperature of the object by using said first signal, and for providing a second signal representative of the temperature for a display means, and display means, responsive to said second signal, connected to said computational means for receiving said second signal and for displaying the calculated temperature of the object.

14. The apparatus as described in claim 13 further comprising:

the contant temperature selected being higher than maximum expected temperature of said object.

15. The apparatus described in claim 13, further comprising:

a lens, generally transparent to infrared radiation, positioned across said opening for focusing said infrared radiation between said temperature sensitive resistive means and said object; and means for attaching said lens to said body.

16. An apparatus for measuring temperature of a living subject, said apparatus comprising:

an elongated probe means including a portion having a reflective concave surface;

a thermoresistive sensor mounted on said probe means in front of said concave surface;

an electronic control circuit connected to said sensor for eléctrically heating the sensor to a predetermined temperature, for maintaining said sensor at the predetermined temperature, and for providing a signal representative of power applied by said control circuit to the sensor;

said probe means being adapted for insertion into a body cavity of a living subject for radiating thermal energy generated by said electrically heated sensor into the body cavity;

computational means connected to said electronic control circuit for monitoring said signal and calculating and displaying temperature of the living subject by using said signal.

17. The apparatus described in claim 15 further comprising:

said probe means being adapted for removably receiving a speculum of pliant material, over said portion having said reflective concave surface;

said speculum including a thermal radiation transparent portion in front of said reflective concave surface when said speculum is located on said probe means.

* * * * *